United States Patent [19]

Michalski

[11] 4,098,564

[45] Jul. 4, 1978

[54] APPARATUS SUITABLE FOR PROTECTING A SPINNERET IN A SPINNERET PACK

[75] Inventor: Arnold Michalski, Easley, S.C.

[73] Assignee: Phillips Fibers Corporation, Greenville, S.C.

[21] Appl. No.: 733,665

[22] Filed: Oct. 18, 1976

[51] Int. Cl.² .............................................. B29F 3/00
[52] U.S. Cl. ................................. 425/461; 425/192 S
[58] Field of Search .................... 425/197, 198, 382.2, 425/378 S, 379 S, 464, 191 S, 192 S; 220/230, 306

[56] References Cited

U.S. PATENT DOCUMENTS

| 1,818,549 | 8/1931 | Furman | 425/67 X |
| 2,872,702 | 2/1959 | Dunlap et al. | 425/69 X |
| 3,240,348 | 3/1966 | Serio | 220/306 X |
| 3,836,302 | 9/1974 | Kaukeinen | 425/197 |
| 3,961,721 | 6/1976 | Gordon et al. | 220/230 |

Primary Examiner—Robert L. Spicer, Jr.
Assistant Examiner—John McQuade

[57] ABSTRACT

Apparatus suitable for protecting a spinneret in a spinneret pack comprises a plate and attaching means connected to the plate suitable for temporarily securing the plate to the spinneret pack so that the plate substantially covers the spinneret face.

6 Claims, 2 Drawing Figures

APPARATUS SUITABLE FOR PROTECTING A SPINNERET IN A SPINNERET PACK

BACKGROUND OF THE INVENTION

The invention relates to an apparatus suitable for protecting the spinneret face of a spinneret pack.

Synthetic fibers are generally produced by melt spinning thermo-plastic polymers, such as, for example, nylon, polypropylene, polyester, etc. In melt spinning synthetic fibers, the polymer used to produce the fibers is melted and pumped through an array of orifices in a plate usually called a spinneret. The melted polymer exiting the spinneret is then in the form of filaments or fibers which are rapidly cooled to a temperature below their melting point and then wound on a pirn or tube to form a package of yarn.

In order to produce high quality yarn it is important that the spinneret and the spinneret pack be in good condition. The spinneret is generally part of a unit known in the art as a pack, spin pack or spinneret pack. A spinneret pack comprises a housing, spinneret, mounting flange for mounting the spinneret to the outlet end of the housing, several screens of various sieve sizes and sand of various particle sizes. The screen and sand in the spinneret pack are used to strain the molten polymer and remove large particles before they reach the spinneret orifices. The pressure drop across a spinneret pack is usually monitored so that when a certain pressure drop is detected the spinneret pack is changed. Generally several spinneret packs are mounted on a beam which is actually a manifold through which the molten polymer travels from an extruder to several spinneret packs. Beams are generally constructed so that the spinneret packs are installed in the beam either from the top of the beam or from the bottom of the beam. Damage to spinnerets, such as a scratch or a dent in the extrusion face which distorts the shape of one or more orifices, is a common problem in fiber plants, and one that is becoming more and more expensive because of the complicated orifice configurations frequently employed. Most of the damage sustained by spinnerets occurs in the spinning area and especially when a spinneret pack is removed or installed in a beam. Although attempts have been made to eliminate or at least reduce such damage, little success has been realized.

An object of the invention is to eliminate or at least minimize damage to spinnerets.

Another object of the invention is to eliminate or at least minimize damage to spinnerets when the spinneret packs are removed or installed in a beam.

Another object of the invention is a method for reducing the number of damaged spinnerets.

Other objects, aspects and avantages of the present invention will be apparent to those skilled in the art after studying the specification, drawings and the appended claims.

SUMMARY OF THE INVENTION

According to the invention an apparatus comprises a plate suitable for covering the spinneret face of a spinneret pack, and attaching means connected to said plate suitable for temporarily securing said plate to said spinneret pack so that said plate substantially covers said spinneret face.

Further according to the invention a plate is placed over the spinneret face of a spinneret pack and clamped to said spinneret pack employing attaching means connected to said plate suitable for temporarily securing said plate to said spinneret pack.

DETAILED DESCRIPTION OF THE INVENTION

Figure 1:
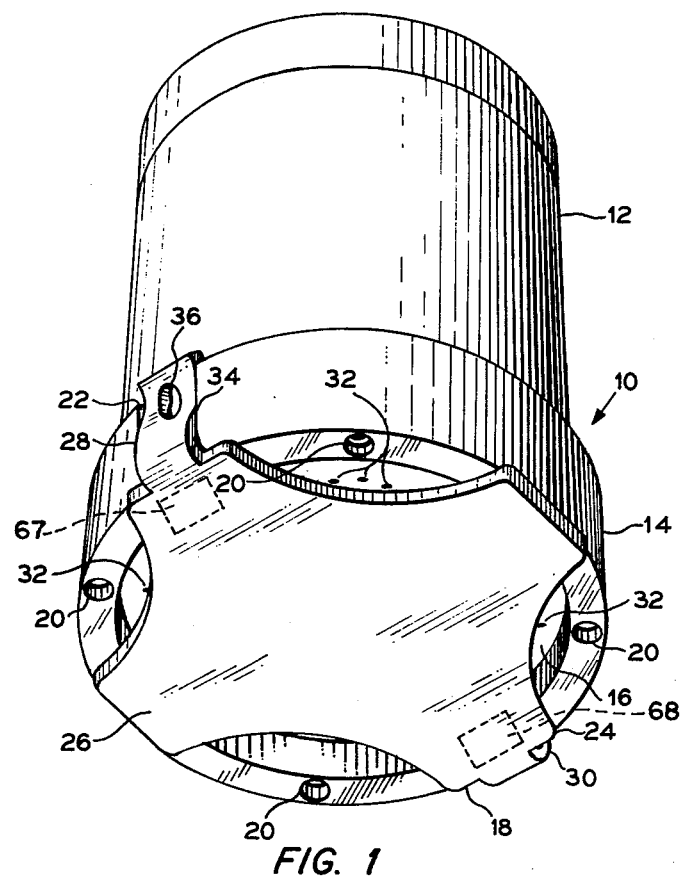
FIG. 1 is a perspective view of a spinneret pack showing one embodiment of the apparatus of the invention.

Referring to the drawing, and in particular to FIG. 1, there is shown a spinneret pack, designated generally by reference numeral 10, having a housing 12, spinneret mounting flange 14, spinneret 16 (in which only the spinneret face is shown) and one embodiment of an apparatus of the present invention 18. Four holes 20 pass through mounting flange 14 for mounting the spinneret pack 10 in the beam (not shown). Housing 12 is preassembled with the screens, sand filters, and spinneret 16. Mounting flange 14 has two grooves 22 and 24 cut into the outer surface thereof. The apparatus of the invention 18 comprises plate 26 and attaching means 28 and 30. Attaching means 28, 30 are connected to plate 26 and are suitable for temporarily securing plate 26 to spinneret pack 10 so that plate 26 substantially covers said spinneret face. As noted above FIG. 1 shows only the face of spinneret 16 and plate 26 of the apparatus of the invention substantially covers the spinneret face as only a few orifices 32 in spinneret 16 are visible beyond the boundaries of plate 26.

In the embodiment of the invention shown in FIG. 1, attaching means 28, 30 fit into grooves 22, 24 of mounting flange 14 respectively. Grooves 22, 24 thus prevent apparatus 18 from slipping off mounting flange 14 in a direction parallel to the spinneret face. Attaching means 28, 30 each comprises a clamp having a clamping portion 34, shown only for attaching means 28, which grips the sides of spinneret pack 10 and particularly mounting flange 14. Each attaching means 28, 30 has an aperture 36, shown only for attaching means 28, to facilitate removal of the apparatus from spinneret pack 10.

In practice, the apparatus is attached to a spinneret pack whenever there is a chance that the spinneret face can be damaged, for example, whenever the spinneret pack is not installed in the beam, or whenever maintenance is being performed on or around the spinnerets. In some instances when the spinneret pack is installed from the top of the beam, the apparatus of the invention cannot be used because of the way the spinneret pack fits in the beam. However, in such instances, the apparatus of the invention can still be used on a spinneret pack when the pack is not installed in the beam.

Again referring to FIG. 1, the clamps of attaching means 28, 30 each extends approximately perpendicular from the opposite ends of the same side of plate 26. Plate 26 has the shape of a square with the length of the square being approximately equal to the largest diameter of the spinneret pack and each of the four corners of the square being removed. Each clamp is an extension of plate 26 with a portion of each clamp bent toward plate 26 to form clamping portion 34.

Figure 2:
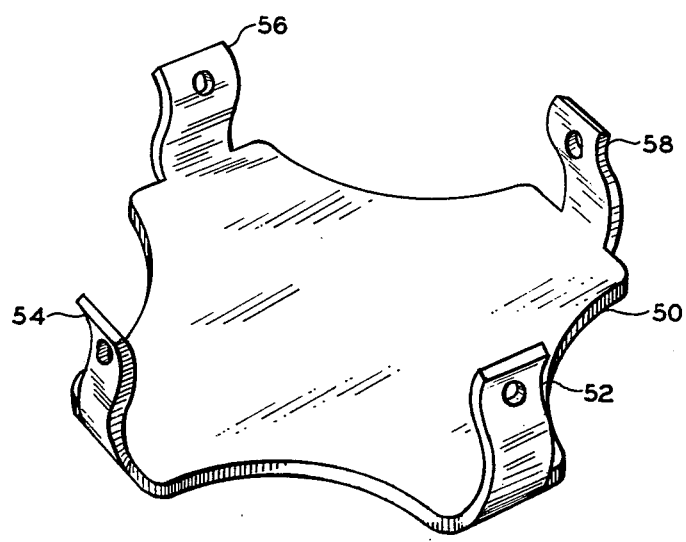
FIG. 2 is a perspective view of another embodiment of the apparatus of the invention.

FIG. 2 illustrates another embodiment of the apparatus similar to that shown in FIG. 1, but having four clamps 52, 54, 56, 58 connected to plate 50. The use of four clamps on the apparatus of FIG. 2 prevents the apparatus from slipping off the spinneret pack in a direction parallel to the spinneret face without using grooves in the mounting flange, such as grooves 24, 24 in mounting flange 14 of FIG. 1. Of course only three such clamps approximately equally spaced around the outside edge of the plate of the invention are needed to restrict the lateral movement of the apparatus with respect to the cylindrical axis of the spinneret pack. The shape of the plate of the apparatus is not particularly important so long as it substantially covers the spinneret face of the spinneret. Also the shape and type of attaching means employed is not especially critical. It is within the scope of the invention to use magnets (such as 67, 68 as shown in FIG. 1) attached to the plate as well as the clamps shown in FIGS. 1 and 2 of the drawings. The main requirement for the attaching means connected to the plate is that it be suitable for temporarily securing the plate to the spinneret pack so that the plate substantially covers the spinneret face.

The apparatus of the invention can be constructed from any suitable material such as, for example, steel aluminum, brass, various polymers, etc. Where polymers are employed as the construction material it is preferred to use a polymer having a relatively high melting temperature as it may be desirable to use the apparatus of the invention on a hot spinneret pack. Also it is desirable to use a polymer with a relatively high impact strength for obvious reasons.

EXAMPLE

A number of apparatus of the invention essentially like that shown in FIG. 1 were constructed from a steel plate about 1 millimeter thick. The plates were 7.7 cm long and the clamps were 1.1 cm high and 0.9 cm long with one circular aperture 0.3 cm in diameter positioned approximately in the center of each clamp. Each corner of the squares was cut off leaving a concave segment having a radius of curvature of 2 cm as viewed from the corner removed, substantially as shown in FIG. 1. Several of the apparatus were used on spinneret packs even when the spinneret pack was installed in the block if maintenance was being done around the spinneret. The apparatus worked so well that they are now used on all spinneret packs before they are installed in a block, on spinneret packs removed from a block for overhaul, and on spinneret packs installed in a block which requires such protection because of maintenance on nearby equipment.

I claim:
1. Apparatus comprising:
 a spinneret pack having a spinneret face,
 a plate which covers the spinneret face of the spinneret pack, and
 attaching means connected to said plate suitable for temporarily securing said plate to said spinneret pack so that said plate substantially covers said spinneret face, wherein the spinneret pack is round and the plate comprises a square, flat steel plate having a length approximately equal to the largest diameter of the spinneret pack and having the four corners of the square removed.
2. The apparatus of claim 1 wherein said attaching means comprises at least two clamps each extending approximately perpendicular from opposite ends of the same side of the plate, and each having a clamping portion suitable for grasping the sides of the spinneret pack.
3. The apparatus of claim 2 wherein each clamp is an extension of said plate with a portion of each clamp bent toward the plate to form the clamping portion or each clamp.
4. The apparatus of claim 3 wherein each clamp has an aperture therein to facilitate easy removal of the plate from the spinneret pack.
5. The apparatus of claim 4 wherein the spinneret pack for a mounting flange with grooves therein suitable for receiving said clamps.
6. The apparatus of claim 1 wherein said attaching means comprises at least one magnet.

* * * * *

UNITED STATES PATENT AND TRADEMARK OFFICE
CERTIFICATE OF CORRECTION

PATENT NO. : 4,098,564
DATED : July 4, 1978
INVENTOR(S) : Arnold Michalski

It is certified that error appears in the above-identified patent and that said Letters Patent are hereby corrected as shown below:

Column 4, line 30, "or" should read --- of ---; line 36, "for" should read --- has ---.

Signed and Sealed this

Twenty-third Day of January 1979

[SEAL]

Attest:

RUTH C. MASON
Attesting Officer

DONALD W. BANNER
Commissioner of Patents and Trademarks